US007962620B2

(12) United States Patent
Safari et al.

(10) Patent No.: US 7,962,620 B2
(45) Date of Patent: Jun. 14, 2011

(54) PROCESSING REQUESTS IN VIRTUAL COMPUTING ENVIRONMENTS

(75) Inventors: Tigran Safari, Fort Lee, NJ (US); Soubir Acharya, Pleasantville, NY (US); Shinichi Urano, River Edge, NJ (US)

(73) Assignee: Kubisys Inc., New York, NY (US)

( * ) Notice: Subject to any disclaimer, the term of this patent is extended or adjusted under 35 U.S.C. 154(b) by 292 days.

(21) Appl. No.: 12/138,589

(22) Filed: Jun. 13, 2008

(65) Prior Publication Data

US 2009/0106424 A1  Apr. 23, 2009

Related U.S. Application Data

(60) Provisional application No. 60/999,661, filed on Oct. 19, 2007.

(51) Int. Cl.
*G06F 15/173* (2006.01)
(52) U.S. Cl. ........... 709/226; 709/223; 709/238; 714/38
(58) Field of Classification Search ........... 709/223–226
See application file for complete search history.

(56) References Cited

U.S. PATENT DOCUMENTS

| | | | | |
|---|---|---|---|---|
| 5,991,529 A * | 11/1999 | Cox et al. | ........................... | 703/9 |
| 6,662,312 B1 * | 12/2003 | Keller et al. | ..................... | 714/38 |
| 6,691,253 B1 * | 2/2004 | Gillenwater et al. | ........... | 714/36 |
| 7,281,165 B2 * | 10/2007 | Liu et al. | ......................... | 714/37 |
| 7,284,016 B2 * | 10/2007 | Venkatesh et al. | ..................... | 1/1 |
| 7,840,673 B1 * | 11/2010 | O'Crowley | ................... | 709/226 |
| 2003/0110263 A1 * | 6/2003 | Shillo | ........................... | 709/226 |
| 2004/0102187 A1 * | 5/2004 | Moller et al. | ................. | 455/418 |
| 2004/0255201 A1 * | 12/2004 | Liu et al. | ........................ | 714/43 |
| 2006/0031653 A1 * | 2/2006 | Todd et al. | ..................... | 711/170 |
| 2007/0057958 A1 * | 3/2007 | Bucher et al. | .................. | 345/568 |
| 2007/0168633 A1 * | 7/2007 | English et al. | ................ | 711/165 |
| 2007/0180325 A1 * | 8/2007 | Bailey et al. | .................... | 714/38 |
| 2007/0288189 A1 * | 12/2007 | Mishuku | ...................... | 702/117 |
| 2008/0022155 A1 * | 1/2008 | Wack | .............................. | 714/40 |
| 2008/0046538 A1 * | 2/2008 | Susarla et al. | ............... | 709/217 |
| 2008/0077762 A1 * | 3/2008 | Scott et al. | .................... | 711/170 |
| 2008/0109680 A1 * | 5/2008 | Kodaka et al. | .................. | 714/38 |
| 2009/0150885 A1 * | 6/2009 | Safari et al. | ........................ | 718/1 |

OTHER PUBLICATIONS

Storage Management Using Windows Server TM 2003 and Windows® Storage Server 2003 Virtual Disk Service and Volume Shadow Copy Service, Aug. 2003, htt_p://www.microsoft.com/.*
Greg Johns et al., Best Practices for VMware ESX Server 3.0 Backup on NetApp, Mar. 2007, http://www.netapp.com/library/tr/.
Solutions for SAP Development and Test Environments with NetApp Storage, Nov. 2007, http://www.netapp.com/library/tr/.
Gangoor Sridhara, Simplifying Microsoft Exchange with Symantec Enterprise Vault and NetApp, Jan. 2008, http://www.netapp.com/library/tr/.
Storage Management Using Windows Server™ 2003 and Windows® Storage Server 2003 Virtual Disk Service and Volume Shadow Copy Service, Aug. 2003, http://www.microsoft.com/.

* cited by examiner

*Primary Examiner* — Wing F Chan
*Assistant Examiner* — Razu A Miah
(74) *Attorney, Agent, or Firm* — Occhiuti Rohlicek & Tsao LLP

(57) ABSTRACT

Methods, systems, and apparatus, including computer program products, for processing read and write requests received from a cloned instance of a server application, the cloned instance of the server application having a corresponding instance that is hosted in a production portion of a computing environment.

20 Claims, 3 Drawing Sheets

PROCESSING REQUESTS IN VIRTUAL COMPUTING ENVIRONMENTS

CROSS-REFERENCE TO RELATED APPLICATIONS

This application claims priority to U.S. Provisional Application No. 60/999,661, filed Oct. 19, 2007, the contents of which are incorporated herein by reference in its entirety. This application is also related to U.S. patent application Ser. No. 12/138,574, entitled "Virtual Computing Environments," filed concurrently with this application, and U.S. patent application Ser. No. 12/138,598, entitled "Appliances in Virtual Computing Environments," filed concurrently with this application, the contents of each of these applications being incorporated herein by reference in its entirety.

BACKGROUND

This invention relates to processing requests in virtual computing environments.

Computing environments for enterprises (e.g., companies or other organizations) often include a number of separate server computers together hosting a variety of different server applications and often incorporating a number of different hardware architectures, operating systems, storage systems, etc. Each server computer may include one or more processors, volatile and non-volatile memory, and a network interface, for example, to enable the servers to collaborate using a local area network (LAN). Server applications, in general, are programs designed to process client requests, often at a high rate. The overall processing in such an environment is often spread across a variety of server applications running on a network of server computers. In addition, such environments often have strict standards for availability and reliability, for example, because of the business consequences of failures or other lack of availability. The term "enterprise computing" has been generally applied to such computing environments, and in the context of the description below, the term should be understood broadly as a computing system that may, but not necessarily, have one or more of the characteristics outlined above.

One trend in enterprise computing is the bifurcation of servers into computers dedicated to hosting server applications and computers or special-purpose networked devices dedicated to hosting data, linked by one or more data networks. The latter set forms an enterprise data storage system. A network of server computers backed by an enterprise data storage system may be readily extensible. Additional computer servers can be connected to the network and use data exposed by the storage system. Redundant servers can share access to storage and process client requests collaboratively, spreading the workload.

An enterprise data storage system is often built using a combination of data storage technologies. For example, server computers and dedicated devices can provide file storage services to host file systems that are accessed over a local area network (LAN), for example, according to Internet Protocol (IP) communication using protocols such as NFS (Network File System), and CIFS (Common Internet File System). Such computers or devices are often referred to as Network Attached Storage (NAS). Server computers may also access dedicated data storage devices over a storage area network (SAN), which in general includes a high-speed special-purpose data network that can be used to interconnect different kinds of data storage devices with associated server computers. For example, a SAN may use Fibre Channel or high-speed Ethernet based communication and protocols such as SCSI (Small Computer System Interface) over Fibre Channel or iSCSI (Internet SCSI) over Ethernet. One or more storage devices on a SAN can be viewed as a single storage resource and striped or partitioned into logical units each identified by a logical unit number (LUN). Within the storage device, a single LUN can be associated with a portion of a disk drive, an entire drive, portions of several drives, or any other combination of drive space. Some storage devices, which are often referred to as "intelligent storage devices," provide additional capabilities or built-in tools, for example, a capability to make snapshots or backups of the state of their data.

Maintaining an enterprise computing environment can be complicated. Often an environment hosts some combination of server applications, which may each be developed within the enterprise or by a third-party, for example Microsoft. Server applications may interact and, when not functioning correctly, may negatively interfere with each other. Every time a new application is introduced, instability may be introduced. Changing from one version of a server application to another version of the same application can have unintended and unanticipated consequences. Even the impact of changing a configuration setting may be dire. The nature of an enterprise-class environment restricts the amount of time a system can be down, even for maintenance.

One approach to maintenance of an enterprise computing environment uses two sets of server computers. A first set of servers forms a primary production environment that is used to perform the required tasks of the environment, for example, providing services to client computers, processing transactions, etc. A second set of servers forms an isolated duplicate test environment. Certain maintenance tasks then involve duplication of some or all aspects of the production environment to serve as a test environment, isolated from the production environment. The data in the test environment can be seeded by copying the data present in the production environment, for example, based on a backup or snapshot of the data stored in the production storage system.

The use of a duplicate test environment can allow a system administrator to make modifications without affecting the production environment. The administrator is free to experiment with new applications, new versions, and new configurations. Once the system administrator fully understands the impact of a modification, and how to make the modification efficiently, the administrator can then bring the production environment into a maintenance window and make the change.

Use of a duplicate environment generally requires the enterprise to acquire twice the hardware and requires the system administrator to do tasks twice, once in the test environment and again in the production environment. Keeping the production and test environments synchronized can be complicated and error-prone. When the administrator does modify the production environment, care must be taken to make exactly the same change that was tested. Otherwise the system administrator may inadvertently introduce a bug.

SUMMARY

In one aspect, in general, an approach to maintaining an enterprise computing environment makes use of a virtual computing environment to host copies of one or more server applications without requiring duplication of the server computers and without necessarily requiring duplication of substantial portions of the data stored in the production storage system.

In general, in one aspect, the invention features a computer-implemented method for receiving a read request from a secondary instance of a server application, the secondary instance of the server application having a corresponding primary instance that is hosted in a first portion of a computing environment, examining the received read request to determine whether the received read request is a first instance of a read request received for a particular target resource, and if so, executing a read operation to read data from a segment of a time fixed data image corresponding to the particular target resource, the time-fixed data image being representative of a state of data in the first portion of the computing environment at a particular point in time, otherwise, executing a read operation to read data from a storage location associated with a second portion of the computing environment.

Aspects can include one or more of the following features.

Executing a read operation to read data from a storage location associated with a second portion of the computing environment, wherein the storage location associated with the second portion of the computing environment is accessible exclusively within the second portion of the computing environment. Executing a read operation to read data from a storage location associated with a second portion of the computing environment, wherein the storage location associated with the second portion of the computing environment comprises a persistent storage location. Executing a read operation to read data from a storage location associated with a second portion of the computing environment, wherein the storage location associated with the second portion of the computing environment comprises a write cache operable to store blocks of data.

Receiving a read request from a secondary instance of a server application, wherein the secondary instance of the server application is one of a set of server application instances, each server application instance of the set being a secondary instance of a server application having a corresponding primary instance that is hosted in a first portion of the computing environment.

Receiving a write request from the secondary instance of the server application; and executing a write operation to write data included in the write request to the storage location associated with the second portion of the computing environment. In some examples, executing the write operation comprises causing a block of data in the storage location associated with the second portion of the computing environment to be replaced by a block of data included in the write request. In some examples, executing a write operation including causing a block of data, or a portion thereof, in the storage location associated with the second portion of the computing environment to be deleted. In some examples, executing a write operation including causing a block of data included in the write request to be appended to a block of data, or a portion thereof, in the storage location associated with the second portion of the computing environment. In some examples, executing a write operation including causing a block of data included in the write request to be stored in the storage location association with the second portion of the computing environment In general, in another aspect, the invention features a computer-implemented method for receiving a write request from a secondary instance of a server application, the secondary instance of the server application having a corresponding primary instance that is hosted in a first portion of a computing environment, and executing a write operation to write data included in the write request to a storage location associated with a second portion of the computing environment.

Executing a write operation to cause a block of data in the storage location associated with the second portion of the computing environment to be replaced by a block of data included in the write request.

Executing a write operation to cause a block of data, or a portion thereof, in the storage location associated with the second portion of the computing environment to be deleted.

Executing a write operation to cause a block of data included in the write request to be appended to a block of data, or a portion thereof, in the storage location associated with the second portion of the computing environment.

Executing a write operation to cause a block of data included in the write request to be stored in the storage location association with the second portion of the computing environment.

Executing a write operation to write data included in the write request to a storage location associated with a second portion of the computing environment, wherein the storage location associated with the second portion of the computing environment is accessible exclusively within the second portion of the computing environment. Executing a write operation to write data included in the write request to a storage location associated with a second portion of the computing environment, wherein the storage location associated with the second portion of the computing environment comprises a persistent storage location. Executing a write operation to write data included in the write request to a storage location associated with a second portion of the computing environment, wherein the storage location associated with the second portion of the computing environment comprises a write cache operable to store blocks of data.

Receiving a write request from a secondary instance of a server application, wherein the secondary instance of the server application is one of a set of server application instances, each server application instance of the set being a secondary instance of a server application having a corresponding primary instance that is hosted in the first portion of the computing environment.

Aspects can include one or more of the following advantages.

As compared to duplicating a substantial portion of a production environment in a an isolated test environment, aspects of the present approach provide a way to have controlled access to the production environment thereby avoiding having to duplicate certain components of the production environment, while still providing isolation for certain server applications allowing a system administrator to make modifications to copies of server applications in such a way that the production environment is not affected.

Other general aspects include other combinations of the aspects and features described above and other aspects and features expressed as methods, apparatus, systems, computer program products, and in other ways.

Other features and advantages of the invention are apparent from the following description, and from the claims.

DESCRIPTION

1 Computing Environment

Figure 1:
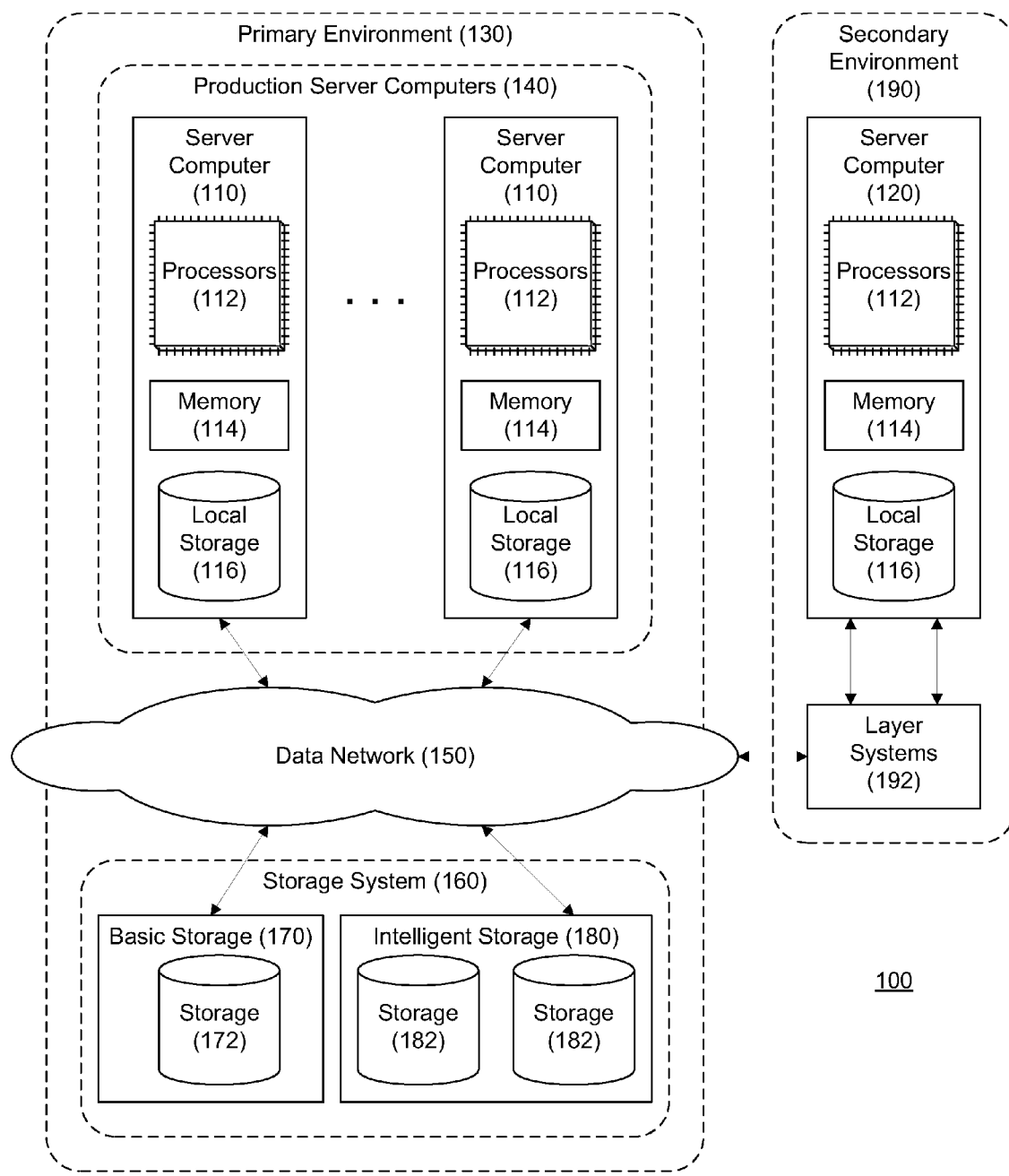
FIG. 1 is a diagram of a computing environment.

Referring to FIG. 1, an example of a computing environment 100 includes a number of server computers 110, each with one or more computing processors 112, memory 114, and, in some embodiments, local storage 116. The server computers 110 are collectively referred to as production server computers 140, with the server computers being interconnected by data network 150. Also connected to the data network 150 is a storage system 160, which in general includes one or more basic storage devices 170 and/or one or more intelligent storage devices 180. Production server computers 140, data network 150, and storage system 160 are all elements of a primary environment 130 that is used to meet the production computing requirements of an enterprise.

There is also a secondary environment 190 that includes one or more additional server computers 120 for hosting instances of one or more server applications present in the primary production environment 130. Solely for the sake of reference, and with no additional meaning or characterization intended, this secondary environment is sometimes referred to below as a "shadow" environment or, when the components are treated as single unit, as a "shadow appliance." The secondary environment 190 is linked to primary production environment 130, including the storage system 160, via the data network 150. In general, the secondary environment 190 is provided with controlled access to the production environment 130 through a layer system 192 in such a manner that the production server computers 140 can continue to meet the requirements of the enterprise and the server computers 120 in the secondary environment can have access to data and services from the primary production environment 130.

2 Secondary Environment

Figure 2:
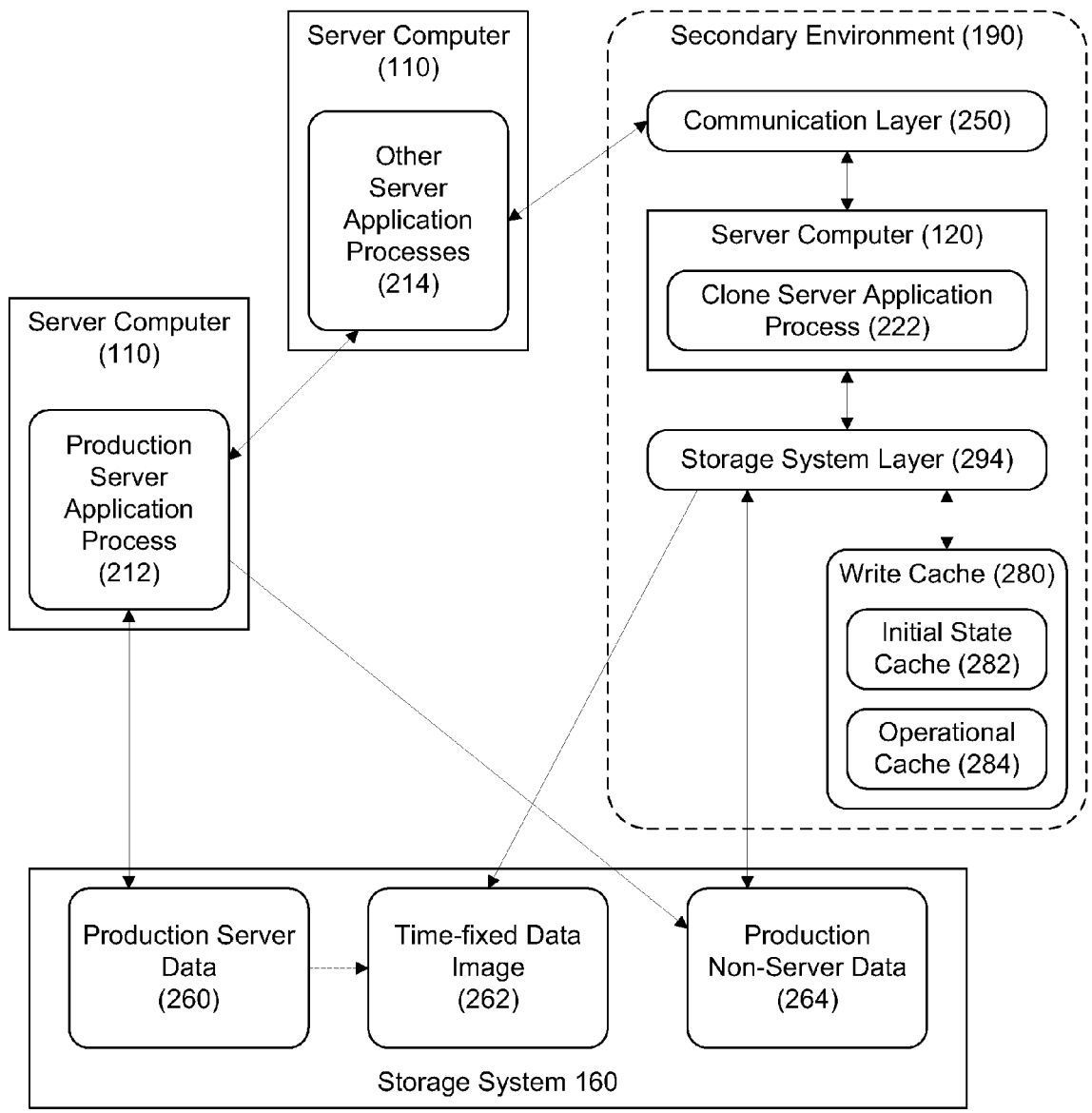
FIG. 2 is a diagram illustrating processes in a computing environment.

Referring to FIG. 2, in an example of a combination of a primary production environment 130 and a secondary environment 190 (see FIG. 1), a server computer 110 hosts an executing production server application 212, for example, an instance of a Microsoft Exchange Server® application. This production application instance makes use of application-specific server data 260 in the storage system. Such server data 260 includes, for example, the server executable, configuration data used by the server application when it is initially executed, as well as runtime data maintained by the server application 212. For example, in the case of an Exchange Server application, the runtime data includes the message storage of electronic mail messages processed by the server application. In addition to the application specific data, the application may access other data in the storage system (e.g. administrative tools), illustrated as non-server data 264, typically in a read-only manner or in a manner such that changes to the data are not significant to other servers in the production environment. The server application 212, in general, communicates with one or more other server applications 214 hosted on the same or other server computers. As an example, the Exchange Server application may communicate with a Microsoft Active Directory® server for services such as user authentication.

FIG. 2 also shows the secondary environment 190. In this example, a clone (or "shadow") server application instance 222 is hosted in the secondary environment 190. For example, a second instance of a Microsoft Exchange Server® application is hosted on a server computer 120 in the secondary environment 190. As is described further below, this clone instance of the server application is essentially identical to the production server application and essentially functions in the same manner as the production application would function. However, the clone instance 222 is isolated from the primary production environment 130 in that its execution has no or insubstantial impact on the processing in the production environment. For example, a system administrator can make changes to the application within the secondary environment 190, for example, by changing the configuration parameters or upgrading the application software, and see the effects of the changes without affecting clients of the primary production environment 130.

In order to run the clone server application 222 without adversely interfering with the primary production environment 130, the application 222 is isolated using a layer system 192. One element of the layer system is the communication layer 250, which routes and masks communication between applications running in the secondary environment 190 and applications running in the primary environment 130. This enables a clone server application process 222 to access other servers 214 in the production environment to the extent that such access does not affect the production environment. For example, a clone instance of a Windows Server application may access a production version of a Web Server, limited to the extent that such accesses do not adversely modify or load the production application. In some embodiments, the clone server application process 222 uses the same identity (e.g., same server name or IP address) as the production server application process 212 being cloned. The communication layer 250 modifies communication passing between the clone applications and the production environment, for example, by modifying network layer and/or application layer addresses and names in outbound and inbound communications between the environments to prevent conflicts and maintain isolation. In some examples, the usage demand on the primary production environment 130 is also limited by throttling requests through the communication layer.

Another element of the layer system is the storage system layer 294, which effectively gives the clone application instance a private view of the accessible data in the environment, including the server application's data. This private view incorporates data available in the storage system 160 and in a write cache 280 reserved for use in the secondary environment. In general, the storage system layer 294 provides an interface for use by the clone server application process 222 that appears to interface with the storage system 160 in the identical manner as application processes in the primary production environment 130 interface with the storage system 160. For certain storage accesses, in particular accesses to non-server data 264 in the storage system, the storage system layer 294 effectively passes data requests and responses (e.g., reads and writes) between the application process 222 and the storage system 160 without modification.

Certain access to the storage system 160 is limited by the storage system layer 294. In particular, access by the clone process that appears to it to access the production server data 260 is limited or filtered. With some exceptions, write operations reaching the storage system layer 294 are routed to the write cache 280. As will be discussed, this includes both operations used in configuring the environment (e.g., operations routed to initial state cache 282) and operations performed by each running clone server application process 222 (e.g., operations routed to operational cache 284). In some embodiments, the system administrator is equipped with tools to allow write operations to reach storage system 160 or to transfer data from the write cache 280 to other storage resources. In some embodiments, the write cache 280 uses dedicated hardware, for example a self contained storage system within a shadow appliance. In some embodiments, the write cache 280 makes use of space in the primary environment's storage system 160. In some embodiments a combination of approaches is used. In some embodiments the write cache is also used to cache the results of read operations. For example, a copy-on-read policy can be used, which may reduce the load on the storage system 160 by caching data that the clone application 222 may repeatedly access.

Read operations reaching the storage system layer 294 are routed either to the write cache 280 if a copy of the requested data is present there, or otherwise to the storage system 160. Production server data 260 and production non-server data 264 are actively used by production server application processes within the primary environment 130. As a result, two consecutive identical read operations from the secondary environment 190 may return different responses. In some embodiments, to provide a consistent view of some or all of the data, the storage system layer 294 provides a mechanism so that the clone application is insensitive to ongoing changes to the data.

As discussed further below, storage system 160 provides one or more mechanisms for creating a time-fixed data image (e.g. a snapshot) 262, which is not altered by the production server application processes. In some embodiments, access requests to data in the storage system are resolved by the storage layer 294 using the time-fixed data image. Read operations for data in the storage system 160 are generally resolved using such a time-fixed data image 262. In some embodiments, read operations may also be resolved using production server data 260 and/or production non-server data 264.

With a suitably configured storage system layer 294 and communication layer 250, the clone server application process 222 is initiated in the secondary environment 190 in such a way that it enters a state that is effectively the same as the state of the production instance of the application at an earlier time. As discussed below in more detail, suitable configuration may require modifications of the time-fixed data image 262 as presented by the storage system layer 294. In some embodiments, such modifications reside in the initial state cache 282.

In some examples, the server computer 120 uses virtual server techniques whereby the operating system environment in which the server application 222 executes is hosted in a virtual environment. In such examples, the server computer 120 includes software for managing instances of the virtual operating environment, for example, software that is referred to as a "hypervisor." The use of virtualization servers to host clone instances of production server applications avoids the need to maintain hardware identical to the hardware used in the primary production environment 130.

Hypervisors are typically designed for particular processor architectures and may run within a commodity operating system or as the operating system itself. A single hypervisor may support multiple operating environments, acting as several server computers concurrently. Server applications hosted on a hypervisor do not need to be adapted for the hypervisor because the hypervisor, when properly configured, completely imitates the machine on which the application was designed to be run. One example of a hypervisor is Xen from Citrix.

3 Data in the Secondary Environment

As introduced above, the clone server application process 222 running in the secondary environment 190 relies, in part, on a time-fixed data image 262 in the storage system 160. This image can be created manually by a system administrator, or through an automated process. An example of an automated process has three phases: determining the data to be captured in the image; capturing the image; and configuring the image for use in the secondary environment. When the secondary environment completes processing using an image, it can be released (e.g. freeing the storage space for re-use) manually or automatically.

Determination of the data to be captured in a time-fixed data image 262 includes determining the systems to be cloned, locating the necessary data associated with applications running on these systems, and, in some examples, flushing application data resident in volatile memory out to non-volatile memory (e.g., to disk) where it can be captured. One approach to determining the data to be captured is for the system administrator to configure it manually, specifying how the application can be "quiesced", for example by choosing appropriate application "writer". In some examples, this is facilitated through automated exploration.

In some examples of such an automated procedure, the production environment is explored and quiesced through the underlying storage system, for example, storage system 160, or the system's storage subsystem, for example, server computer 110. In one example, the storage system 160 will provide time-fixed data image 262 via its own mechanism of creating snapshots. In one example, in a primary production environment using Microsoft VSS, the application is quiesced and the VSS snapshot is created. In some embodiments, these two methods may be combined.

In most embodiments, applications are located. A variety of Microsoft server applications have Windows Management Instrumentation (WMI) enabled. In some embodiments, an automated system connects to WMI looking for various characteristics for server applications, as well as known server application handshakes, and discovers details about the application topology. Applications will determine storage locations. In some embodiments, the operating system is queried for path information associated with application. The information about storage locations is then used to develop a storage map and to determine interconnections between servers.

Once the storage map is determined, the data is captured in a time-fixed data image 262. The image preferably contains stable information usable by the secondary application. However, in a typical production environment, server application data may be constantly altered by the running application process. This makes it difficult to create a self-consistent time-fixed data image. This can be further complicated if the application uses a memory buffer, since buffered application data is not necessarily in the storage system. A time-fixed data image taken in such a state may be merely crash consistent. In some embodiments, a preparatory step is used to force the server application into a state where the data in the storage system can be captured in a consistent and complete manner.

One approach for obtaining a consistent and complete state for a server application is to shut down the server application process. The running production server application can be shut down gracefully and the data fixed or copied using one of the techniques discussed below. Such time-fixed data would in general be very suitable for restarting the server application, since the application shut down properly. In a typical production environment, where constant server application availability is expected, shutting down server applications is not always an option.

Approaches for obtaining a consistent and complete state for a server application are possible without completely shutting down the server application process. Some applications provide a native interface for flushing memory, creating a checkpoint (a stable state of the application flushed to storage), and/or for forcing the server application into a quiescent state ("quiescing the application"). Such an interface is used to avoid shutting down the application while obtaining a stabilized storage state. In some production environments, some server applications are run from within a production hypervisor. In order to obtain a proper stable state, since file activity passes through the hypervisor where it may be buffered, the application is stabilized and then the hypervisor is stabilized. In some cases, as is discussed below, an inconsistent or incomplete data image can be used after additional analysis to address the inconsistency or incompleteness.

Once any preparatory effort is complete, a time-fixed data image is created. In some examples where the production server data 260 is hosted in an intelligent storage device, forming of the time-fixed data image 262 leverages an ability of intelligent storage to create time-fixed read-only images of data (e.g. snapshots). For example, the intelligent storage may have a capability to make a copy of the server data at a particular instance, and that data is then configured (if necessary) so that it can be accessed using the same types of access primitives as the original server data. For example, data 262 may be accessible according to a LUN (different than the LUN of the production data) in the storage device.

One example of a method for obtaining a time-fixed data image is a snapshot that is created such that after triggering the snapshot all future write instructions are redirected to a new location (thus preventing over-writing of the older snapshot version). Other techniques can also create a similar result. Solutions are readily available, for example, from NetApp (implementing a snapshot as discussed) or Microsoft using Microsoft Volume Shadow Copy Service® (VSS).

In some embodiments, a combination of methods are used for obtaining a time-fixed data image. For example, VSS is used to create what Microsoft® calls a "Shadow Copy" of a file or volume. The VSS shadow copy is then stored in intelligent storage where a second snapshot is created. This nested approach creates a time-fixed image of the VSS shadow copy where the VSS shadow copy may have originated from data stored on a server computer's local storage. The time-fixed image may also contain multiple VSS shadow copies, collected from multiple server computers.

The stable state written to storage and captured in time-fixed data image 262 may not be suitable for starting an instance of the application process in the secondary environment. For example, some applications record information indicating a graceful shutdown which is not present when creating a checkpoint. Before starting a virtualized instance of a server application in the secondary environment, the application data may need to be modified to give the appearance of a graceful shutdown. The modifications can be made manually or through an automated process, for example using a knowledge base of known applications and corresponding potentially required modifications ("patches") for the snapshot. In some examples, these modifications are made in the initial state cache 282 used by the storage system layer 294 and are only visible within the secondary environment 190 when read requests are made to the modified portions.

Additional modifications may also need to be made to address inconsistencies present in the time-fixed data image 262. Inconsistencies can be caused, for example, by an application that had only written part of an event or transaction at the time the image was created. One situation where this can happen is if the server interacts with other servers and is waiting for a response to a request. One server may have processed an event and flushed it to storage, while another server may not yet have processed the event and therefore did not flush it to storage. Discrepancies in the process states can be addressed.

One approach is to address it when a server-based snapshot is inspected for changes made since the last time this snapshot was created and the blocks that were changed during this time are found. This condition is then copied to the original virtual disk to re-establish the original state of the consistency point. For example, if using a nested approach incorporating snapshots of VSS shadow copies, the internal VSS shadow copies can be rolled back to obtain a cohesive state. Alternatively, events can be completed by importing the data from the production environment, for example by reading production server data 260.

Once the time-fixed data image 262 has been created and any required initial modifications made, the secondary environment storage system layer 294 configures virtual disks containing the server application executable and the associated application data (e.g., a virtual image of production data 260). These virtual disks are presented to the secondary environment using the production environment based on a configuration file presented by the hypervisor. The configuration file will be created as part of the process.

The discussion above focuses on a single cloned server application in the secondary environment. In general, multiple virtualized server applications can be running within the secondary environment. Instantiation of multiple server applications may lead to additional complexity when establishing each clone instance because the time-fixed images of each server may not be consistent. However, discrepancies can be resolved using similar procedures as applied to a single application as discussed above.

When multiple server applications are brought into the secondary environment, each virtualized application is based on a read-only time-fixed image of the production instance captured in a stable state. A file-system interface with a write cache allows these images to be used and treated as modifiable. And modifications can be made within the write cache to put the images into a state suitable for starting the server applications.

Figure 3:
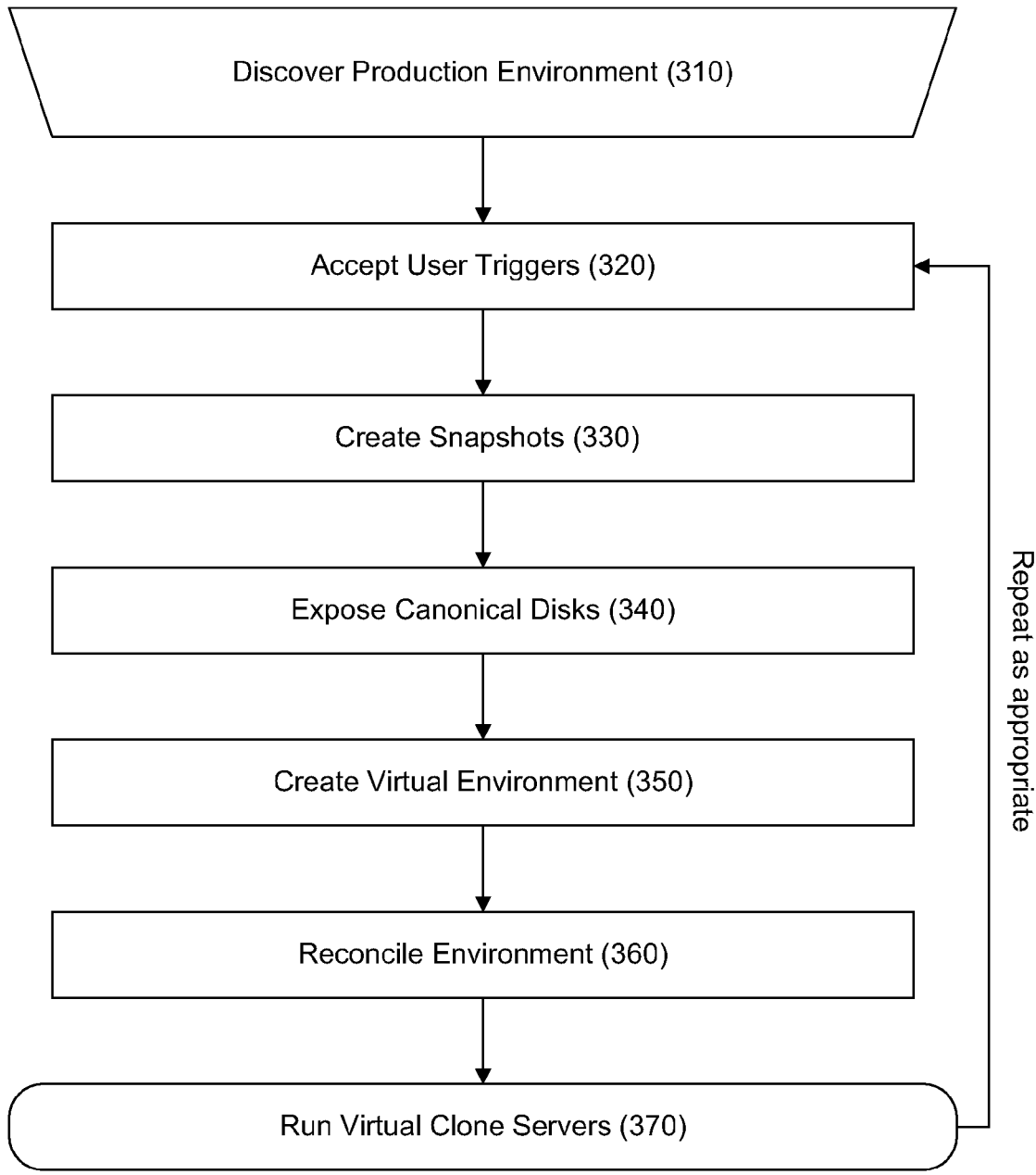
FIG. 3 is a flowchart.

4 Example of Creating Running Application Instances in the Secondary Environment Referring to FIG. 3, one exemplary scenario for establishing a clone server application process begins with first discovering the production environment 310 and presenting it to a system administrator. This step includes determining the network topology through storage and network scans and examining registries and configuration files for any additional dependency and location information. Where all of the data location and configuration information needed to fully clone a server application is available, a virtualization-candidate group is formed. Necessary elements include finding the application's executable file in storage, sufficient configuration information to start the application, and all the elements upon which the application depends, for example the correct operating system. The virtualization-candidate group is represented, in this example, in a data file characterizing the group information, e.g., a clone configuration file. Where only partial information is discovered, a partial-candidate group is formed. In some cases the missing elements can be added later either manually or through adequate substitutions. Virtualization-candidates and partial-candidates are presented to the system administrator.

The system administrator corrects any errors in the candidate groups, fills in any missing data (e.g., converts partial-candidates into complete virtualization-candidates), and selects one or more groups for cloning in the secondary environment. The administrator provides administrative instructions 320 and the data storage locations specific to the selected groups are captured and configured for cloning in the secondary environment. As discussed above, the selected processes are stabilized and snapshots or other time-fixed data images are created 330.

The storage system layer is next configured for the application 340. The time-fixed data images are assigned addresses and configured in the storage system layer as virtual disks. In some cases, partial-candidates are completed using alternatives. For example, an alternate source from other candidates will be selected and the system can be provisioned. The storage system layer is further configured to establish the operational write cache for termination of write operations and, in this example, read operations. Per-resource throttle values limiting the rate of operations terminating against production storage is also configured. In addition to the storage system layer, the communication layer is also configured.

With the layer systems in place, the virtual environment is next created 350. A hypervisor is configured to clone the necessary production server operating environments. This includes identifying and configuring appropriate operating systems, configuring registries, directory services, and authentication services (which may be the production services). In some cases hardware drivers in the hypervisor environment may need to be replaced to enable the proper functionality in the secondary environment. A private virtual network is established to enable communication between cloned servers running in the secondary environment. In this example, the communication layer manages communication within the private network. Once the environment is active, a system administrator can access the servers in the secondary environment, for example by logging into them.

The time-fixed data images and the environment are reconciled and, using the initial state write cache, modified to create a stable consistent starting point for starting the server applications within the secondary environment 360. Data only relevant to incomplete events present in one or more time-fixed data images are removed from the images, within the initial state write cache, using a data rollback technique.

Once the environment is fully constructed and prepared, the clone server applications are instantiated (i.e., executed) within the secondary environment 370. Each application is initiated in the same manner as it would be initiated in the production environment. These application processes see the storage system layer as if it were directly attached to the production storage system and the communication layer as if it were directly attached to the production network. The computing environment appears to these applications as though the applications were running in the primary production environment. Additional server applications can be introduced into the secondary environment by repeating the process. An existing cloned application can likewise be restored to the version operating in the primary environment by repeating the process.

Hypervisor preparations for application testing are then made for each clone. In each virtual clone the virtual controlling device is created. The virtual controlling device is tasked to provide networking services as well as a gateway that launches various application-specific workflow tasks.

Within the hypervisor, each virtual controlling device is connected to a virtual control interface via an internal network. The virtual control interface has a Dynamic Host Configuration Protocol (DHCP) Server that assigns IP addresses on this internal network. Each virtual controlling device runs a DHCP client to receive an IP address on this network.

The virtual controlling device runs a DHCP server which currently assigns same IP addresses as defined for each server on the primary network. The virtual machines on the secondary network receive these IP addresses based on the MAC address of the network interface.

The virtual controlling device has an interface on each virtual clone's network and assigns itself the gateway IP address for that network. The virtual controlling device can use Network Address Translation (NAT) to gate virtual clone's packets to the virtual control interface via the internal network between the virtual control interface and the virtual controlling device.

Another NAT in the virtual control interface to further gate the packets to the actual gateway to the primary network.

5 Applications

Virtualized clone server applications instantiated in a secondary environment as discussed above can be used for many different purposes. In some examples, the secondary environment can provide the equivalent of an isolated duplicated test environment without needing to make a separate copy of the entire production storage. For example, in cases in which an intelligent storage system has the capability of forming a snapshot of the production server data quickly, a clone of production server application can be instantiated with low delay. When the clone application makes block-level changes to the production data, these changes are cached and therefore remain isolated from the production environment.

In some examples, the secondary environment provides what is essentially a duplicated test environment in which some access to the production environment is allowed as controlled by the layer systems. For example, the cloned server application is isolated from the production server, but a system administrator may, for example, log into the virtual server and still be able to access his personal data and other information that is not related to operation of the server application.

In some examples, the clones mirror the production versions of the applications with the added options of altering configurations, repeating transactions, accessing old snapshots, adding triggers for alarms or events, determining essential data blocks based on usage, and quickly creating realistic test environments.

Additionally, the ability to create time-fixed data images and use them as the basis of running virtual clones is extended in some embodiments to an ability to clone the clones themselves. The system administrator can then have multiple clones branched from the primary environment or from the secondary environment.

In some examples, the infrastructure and cloning schemes described above allow for a comprehensive approach to testing changes to an active server application without adversely impacting the production system or the people and processes relying on the production system. The secondary environment is used as a testing environment for testing changes to production server applications without impacting the primary environment. Once the impact of a change is well understood, it can be applied to production servers with predictable results. Additionally, since the test environment is integrated into the network, the changes to the production environment can be managed from the test environment.

In some examples, when testing well known servers, for example Microsoft Exchange Server®, an automated test suite can be used. The testing infrastructure can configure a cloned instance of the well known server based on established norms and known dependencies, for example, as stored in a knowledge base. Additionally, limitations that are associated with particular versions of the known server can be predetermined instead of requesting test configuration input from a system administrator. For example, a test application can make use of Windows Management Instrumentation (WMI) calls to communicate with Microsoft® servers.

In some embodiments, the system models real-world interaction with the cloned production environment via a predefined set of workflows. An automated process of tasks or a set of tasks based on a predefined condition reached on the production environment can be defined. In some embodiments, if the a certain condition is achieved then the system is cloned or recreated along with the entire supporting server and storage infrastructure in a separate environment. The condition is then treated with either a predefined or a further customized battery of workflows.

There may be no predefined outcome of the treatment to the condition since every environment is unique by definition. The results are returned along with a step-by-step procedure for the treatment once the condition is treated to a satisfaction. Results can be achieved by aging the clone of the environment. An aging procedure can be used to cripple the cloned environment with a predefined set of simulation tests to worsen the conditions. Results can also be achieved by a repetitive injection of the same procedure to diagnose the weak link in the system. Neither aging nor repetitive injection are currently, if ever, possible on a production environment due to their invasive and dangerous nature.

In some examples, the system automates test production systems without interrupting critical systems that would be impaired or distorted by intervention. The platform defines a method of parallel testing against production with real production data that is organized in an application centric manner. Destructive and non-destructive testing can be performed against this clone environment.

The test platform contains a clone of the production server, including current server workloads from the production environment. The platform provides timeline navigation to locate events of interest. In some embodiments, the platform provides the ability to run, or re-run, workflows (aggregate descriptions of discrete server tasks and activity) against a previous state of the production server and environment. Because tests do not write over the production data, workflows can include any task or activity without concern about writing data or other potentially destructive aspect. However, tests can use the exact same data as the production server, so workflow construction rules can also allow for realistic predictions of the future state of a production environment and server. An administrator can inspect workflows to identify bottlenecks in production or test configurations. The ability to run various workflows against different clones allows for modeling, testing, and analysis of "what if" scenarios.

Some embodiments further provide an interactive framework for the user to compose a detailed workflow of activities to be performed in the test clones. The workflow is built using building blocks that consist of primitives that are aggregated to form a Task. Workflow tasks can be performed sequentially or in parallel. The workflow semantics allow designs for parallel flow by selecting more than one server in the secondary environment. The split and merge of streams allow parallel or sequential flow in a workflow.

Further, the workflows are executed against the virtual machines. Each workflow consists of task modules. These task modules are stored in the virtual control interface, and are seen by the virtual machines via several mechanisms:

The virtual control interface will export a directory containing the workflows on the internal network via Network File System (NFS).

Each virtual controlling device mounts (maps) this NFS.

Each virtual controlling device shares this NFS as a Common Internet File Share (CIFS) share to the virtual clone's network(s).

In some embodiments, the workflows are executed as per a specification stored in XML. Each workflow consists of a sequence of tasks, where each task can be a primitive task, or a set of sequences of tasks that are to be executed in parallel.

When the workflow is started, its specification is parsed and each task is given an entry in the configuration stored on the secondary network. The tasks are linked as per the specification so that each task learns about the number of tasks that have to complete before it starts, and the next task(s) that should start once the task is finished.

When each task is finished, it decrements the number of tasks that each of the next tasks are waiting on. For each task, when the number of tasks that it is waiting on reaches 0, it is started. If a task has no next tasks, it is the last task, and when it is finished, the entire workflow is finished.

As a result, each task module is executed via the series of steps.

The virtual control interface creates a directory underneath the NFS share, called 'iodir' for transferring files to or from the virtual clone.

The virtual control interface connects to the virtual controlling device via Secure Shell interface (ssh) and then executes winexe (well known open source utility) to start the task module on the CIFS share at the target virtual machine.

The virtual control interface monitors the iodir for the status and output files.

As status and output files are written to the iodir, the information there are uploaded to secondary network.

In one example workflow, a system administrator managing a Microsoft Exchange Server® installation can create a clone of the server and test a database capacity limitation and defragmentation scenario. First, a system administrator using a WMI interface on the production server determines the current size and maximum size for the database. The maximum size of the database may depend on the server version or edition and service pack or may be limited only by the available storage space. The system administrator than initiates an automated test workflow with this information.

The automated test workflow, in this example, creates a new database similar to the existing database, matching the configuration of storage groups, mailbox stores, etc. Existing mailboxes are moved from the original database to the new one. The size of the new database is determined and compared to the original database. The new database does not need to be defragmented using a tool like Microsoft® Eseutil because it is a fresh database. The new database is then automatically tested to make sure that users can access their mailboxes and that mail flow is functioning. This can be done using additional tools like Microsoft® LoadSim. The test can further verified by deleting the old database from the cloned environment.

In another example workflow, a system administrator managing a Microsoft Exchange Server® installation can test a scenario requiring a backup recovery. In this test the system administrator creates a clone instance of the server environment and then manually, or using an automated software tool, restores a server from a backup tape or disk image. Any portion of the backup can be restored as appropriate for the test. For example, only a portion of the database, the entire database, or the entire system, can be restored.

In another example workflow, a system administrator managing a Microsoft Exchange Server® installation can test SMTP message queue management scenarios. The server SMTP message queue can be aged to predict mail flow in the environment. Possible causes for message accumulation include:

1. Corrupted message
2. Invalid recipient address
3. Invalid message property
4. Third-party application
5. Low system resources or general system performance problem
6. Exchange Information Store service experiencing malfunction
7. Absence of a route
8. Multiple Active Directory® issues The aged clone will reveal the problem before the production version. The test can use the production work load, a simulated work load based on the production work load, or a simulated work load based on other factors.

Tests can work in concert with production servers to track changes and drifts in key production signatures. The signatures are handled in the test environment as part of a workflow task that supports identical workload as that of production. This is analogous to a system under emulation where inputs (production stimuli) are applied to the test (system in defined state), and the output from workflow tasks (predicted future state) characterize eventual views of the production servers.

Early detection and intervention reporting provides a system administrator with the ability to management real world perturbations and critical infrastructure issues in a data center proactively and with minimal disruption and limited quality of service impairment.

Results of tests can be presented to the system administrator in a graphical manner. The status of a running workflow can be, for example:

Success—workflow ran to completion and all task stages reported no errors
Failure—there occurred a failure in a task stage that may occur in production if run
Running—workflow active and no task stage errors detected
Not Started—workflow task has not started The user interface can be provided through an HTML browser or through some other interface. In one embodiment, the user interface uses a collection of visual panes. One pane is used for navigation between clone branches, another pane is used to show active workflows, another pane to show results, another pane to represent the virtual test environment, another pane to show help, and so on. The navigation pane can, for example, display a timeline representing the current production environment and the various clone snapshots. Running clones are represented differently from paused instances. The various panes can be of different sizes, for example the active pane (the pane with which the system administrator is currently interacting) can be made larger than the other panes. The user interface can facilitate the creation of workflows and can facilitate monitoring progress through a workflow.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A method for processing requests in a computing environment that includes a production environment and a test environment, the method comprising:
   receiving, by a layer system of the computing environment, a read request from a secondary instance of a server application, the secondary instance of the server application being hosted in the test environment and having a corresponding primary instance that is hosted in the production environment;
   examining the received read request to determine whether the received read request is a first instance of a read request received for a particular target resource, and if so, executing a read operation to read data from a segment of a time-fixed data image corresponding to the particular target resource, the time-fixed data image being representative of a time-fixed state of data in the production environment, otherwise, executing a read operation to read data from a storage location associated with the test environment;
   receiving a write request from the secondary instance of the server application; and
   executing a write operation to write data included in the write request to the storage location associated with the test environment,
   wherein the secondary instance of the server application is one of a set of server application instances, each server application instance of the set being a secondary instance of a server application having a corresponding primary instance that is hosted in the production environment.

2. The method of claim 1, wherein the storage location associated with the test environment is accessible exclusively within the test environment.

3. The method of claim 1, wherein the storage location associated with the test environment comprises a persistent storage location.

4. The method of claim 1, wherein the storage location associated with the test environment comprises a write cache operable to store blocks of data.

5. The method of claim 1, wherein executing the write operation comprises one or more of the following:
   causing a block of data in the storage location associated with the test environment to be replaced by a block of data included in the write request;
   causing a block of data, or a portion thereof, in the storage location associated with the test environment to be deleted;
   causing a block of data included in the write request to be appended to a block of data, or a portion thereof, in the storage location associated with the test environment; and
   causing a block of data included in the write request to be stored in the storage location association with the test environment.

6. A method for processing write requests in a computing environment that includes a production environment and a test environment, the method comprising:
   receiving, by a layer system of the computing environment, a write request from a secondary instance of a server application, the secondary instance of the server application being hosted in the test environment and having a corresponding primary instance that is hosted in the production environment; and
   executing a write operation to write data included in the write request to a storage location associated with the test environment, the executing including one or more of the following:
   causing a block of data in the storage location associated with the test environment to be replaced by a block of data included in the write request;
   causing a block of data, or a portion thereof, in the storage location associated with the test environment to be deleted;
   causing a block of data included in the write request to be appended to a block of data, or a portion thereof, in the storage location associated with the test environment; and
   causing a block of data included in the write request to be stored in the storage location association with the test environment.

7. The method of claim 6, wherein the storage location associated with the test environment is accessible exclusively within the test environment.

8. The method of claim 6, wherein the storage location associated with the test environment comprises a persistent storage location.

9. The method of claim 6, wherein the storage location associated with the test environment comprises a write cache operable to store blocks of data.

10. The method of claim 6, wherein the secondary instance of the server application is one of a set of server application instances, each server application instance of the set being a secondary instance of a server application having a corresponding primary instance that is hosted in the production environment.

11. A non-transitory machine-readable medium that stores executable instructions to cause a machine to:
    receive a read request from a secondary instance of a server application, the secondary instance of the server application being hosted in a test environment of a computing environment and having a corresponding primary instance that is hosted in a production environment of the computing environment;
    examine the received read request to determine whether the received read request is a first instance of a read request received for a particular target resource, and if so, executing a read operation to read data from a segment of a time fixed data image corresponding to the particular target resource, the time-fixed data image being representative of a time-fixed state of data in the production environment, otherwise, executing a read operation to read data from a storage location associated with test environment;
    receive a write request from the secondary instance of the server application; and
    execute a write operation to write data included in the write request to the storage location associated with the test environment,
    wherein the secondary instance of the server application is one of a set of server application instances, each server application instance of the set being a secondary instance of a server application having a corresponding primary instance that is hosted in the production environment.

12. The machine-readable medium of claim 11, wherein the storage location associated with the test environment is accessible exclusively within the test environment.

13. The machine-readable medium of claim 11, wherein the storage location associated with the test environment comprises a persistent storage location.

14. The machine-readable medium of claim 11, wherein the storage location associated with the test environment comprises a write cache operable to store blocks of data.

15. The machine-readable medium of claim 11, wherein the instructions to execute a write operation comprises instructions to:
cause a block of data in the storage location associated with the test environment to be replaced by a block of data included in the write request;
cause a block of data, or a portion thereof, in the storage location associated with the test environment to be deleted;
cause a block of data included in the write request to be appended to a block of data, or a portion thereof, in the storage location associated with the test environment;
cause a block of data included in the write request to be stored in the storage location association with the test environment, or some combination thereof.

16. A machine-readable non-transitory medium that stores executable instructions to cause a machine to:
receive a write request from a secondary instance of a server application, the secondary instance of the server application being hosted in a test environment of a computing environment and having a corresponding primary instance that is hosted in a production environment of the computing environment; and
execute a write operation to write data included in the write request to a storage location associated with test environment, including:
causing a block of data in the storage location associated with the test environment to be replaced by a block of data included in the write request;
causing a block of data, or a portion thereof, in the storage location associated with the test environment to be deleted;
causing a block of data included in the write request to be appended to a block of data, or a portion thereof, in the storage location associated with the test environment;
causing a block of data included in the write request to be stored in the storage location association with the test environment, or some combination thereof.

17. The machine-readable medium of claim 16, wherein the storage location associated with the test environment is accessible exclusively within the test environment.

18. The machine-readable medium of claim 16, wherein the storage location associated with the test environment comprises a persistent storage location.

19. The machine-readable medium of claim 16, wherein the storage location associated with the test environment comprises a write cache operable to store blocks of data.

20. The machine-readable medium of claim 16, wherein the secondary instance of the server application is one of a set of server application instances, each server application instance of the set being a secondary instance of a server application having a corresponding primary instance that is hosted in the production environment.

* * * * *